United States Patent [19]

Suyama et al.

[11] Patent Number: 5,041,624

[45] Date of Patent: Aug. 20, 1991

[54] POLYMERIC PEROXY ESTER AND ITS USE

[75] Inventors: Shuji Suyama; Hideyo Ishigaki; Katsuki Taura, all of Chita, Japan

[73] Assignee: Nippon Oil and Fats Company, Limited, Tokyo, Japan

[21] Appl. No.: 416,835

[22] Filed: Oct. 3, 1989

[30] Foreign Application Priority Data

Oct. 13, 1988 [JP] Japan .................................. 63-255770
Nov. 10, 1988 [JP] Japan .................................. 63-282619
Jan. 24, 1989 [JP] Japan .................................. 1-13296
Feb. 17, 1989 [JP] Japan .................................. 1-36327

[51] Int. Cl.$^5$ ........................ C07C 331/00; C08F 4/32
[52] U.S. Cl. ..................................... 560/302; 526/232
[58] Field of Search ....................... 526/232; 560/302

[56] References Cited

U.S. PATENT DOCUMENTS

| 2,401,581 | 6/1946 | Muskat et al. | 526/232 |
| 3,135,805 | 6/1964 | Gilmont | 526/232 |
| 3,222,327 | 12/1965 | Guillet et al. | 526/232 |

FOREIGN PATENT DOCUMENTS

| 61-143402 | 7/1986 | Japan | 526/232 |
| 1-156325 | 6/1989 | Japan | 560/302 |
| 1-221417 | 9/1989 | Japan | 560/302 |

Primary Examiner—Joseph L. Schofer
Assistant Examiner—N. Sarofim
Attorney, Agent, or Firm—Stevens, Davis, Miller & Mosher

[57] ABSTRACT

A polymeric peroxy ester, which consists of a structural unit represented by the formula (I):

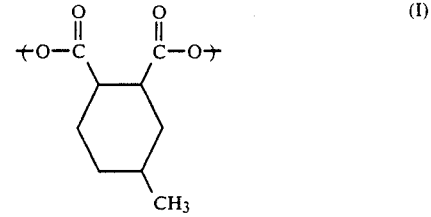

and a structural unit represented by the general formula (II):

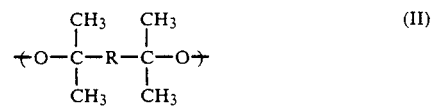

, wherein R represents —CH$_2$CH$_2$—, —C≡C— or

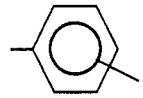

and had an average molecular weight or 1,000–15,000, said structural units (I) and (II) being bonded alternately in a molar ratio within the range of from 6:4 to 4:6, has a 10-hour half-life period temperature of 70°–85° C. and a high activity at relatively high temperature, is safe in the production and handling, is adapted to be used as a polymerization initiator in the polymerization of vinyl monomer, and can produce a vinyl polymer having a high molecular weight.

2 Claims, No Drawings

POLYMERIC PEROXY ESTER AND ITS USE

BACKGROUND OF THE INVENTION

1. Field of the Invention

This invention relates to a novel polymeric peroxy ester, which is useful as a free radical-generating agent to be used for vinyl monomer, and a method for producing a polymer having a high molecular weight and further having a high mechanical strength by the use of the polymeric peroxy ester.

2. Related Art Statement

There has been known a diacyl type polymeric peroxide obtained by the polycondensation reaction of dibasic acid chloride with sodium peroxide. That is, Ber., Vol. 27, page 1,510 (1984) discloses that the reaction of a phthalic acid chloride with sodium peroxide results in a corresponding diacyl type polymeric peroxide, and Chem. Abst. Vol. 60, 5,293d (1964) and Vol. 60, 10,892e (1964) disclose that the reaction of an aliphatic dibasic-acid chloride with sodium peroxide results in a diacyl type polymeric peroxide represented by the following general formula:

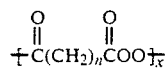

wherein n represents a positive integer of 2-10 and x represents a positive integer of 16-35. Japanese Patent Laid-open Specification N o. 53,149,918 discloses a diacyl type polymeric peroxide having ester linkages, which has been obtained by the reaction of a dibasic-acid chloride having ester linkages in its molecule with sodium peroxide. Japanese Patent Laid-open Specification Nos. 59-38,233, 59-93,725, 59-176,320 and 59-227,904 disclose diacyl type polymeric peroxides obtained by the reaction of a dibasic acid having branched or unsaturated hydrocarbon groups in its molecule with sodium peroxide.

Zh. Org. Khim., Vol. 13, No. 9, page 1,842 (1977) discloses that an aliphatic or aromatic dibasic acid chloride with 2,5-dimethylhexane-2,5-dihydroperoxide results in a corresponding polymeric peroxy ester. U.S. Pat. No. 3,117,166 specification discloses that the reaction of phthalic acid- or fumaric acid-chloride with 2,5-dimethylhexane-2,5-dihydroperoxide results in a corresponding polymeric peroxy ester.

It is commonly known that these diacyl type polymeric peroxides or polymeric peroxy esters are effective as a polymerization initiator for vinyl monomer. For example, it is reported in Chem. Abst., Vol. 67, 54,445a (1967) that, when the above described polymeric peroxide is used as a polymerization initiator, a polymer having a molecular weight as high as two times that of a polymer obtained by the use of benzoyl peroxide can be obtained. Further, it is reported in Chem. Abst., Vol. 84, 136,120f (1976) that, when the above described polymeric peroxide is used as a polymerization initiator for vinyl acetate, a polymer, which is larger in the molecular weight and is less in the amount of branches than a polymer obtained by the use of benzoyl peroxide, can be obtained.

Further, it is known that, in the production of vinyl polymer, when a polymer having a high average molecular weight is produced, the object of obtaining a polymer having a high mechanical strength can be attained. In general, a polymer having a high average molecular weight can be obtained by decreasing the use amount of polymerization initiator or lowering the polymerization temperature, but such procedure lowers noticeably the polymerization rate, that is, productivity, and hence such procedure is not a commercially available method.

In order to obviate these drawbacks, Japanese Patent Laid-open Specification Nos. 53-28,685 and 54-107,994, Japanese Patent Application Publication No. 58-56,561, Japanese Patent laid-open Specification Nos. 60-206,809, 60-206,810 and 60-185,512 and recent Japanese Patent Laid-open Specification No. 62-54,704 disclose embodiments, wherein a polymer having a high molecular weight or having a high mechanical strength is produced by the use of a specifically limited bifunctional peroxide or trifunctional peroxide having 2 or 3 peroxy bonds respectively in one molecule. Further, Japanese Patent Laid-open Specification Nos. 60-8,304, 60- 13,805 and 60-152,517 disclose the production of a polymer having a high mechanical strength by the use of a specifically limited diacyl type polymeric peroxide, which has a structural unit represented by the following formula

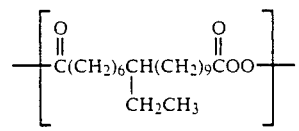

and has 3 or more of peroxy bonds in one molecule.

Further, there is known a method, wherein a combination of at least 2 kinds of polymerization initiators is used, as one of the methods for obtaining a polymer having a high molecular weight without decreasing the polymerization rate. For example, Japanese Patent Application Publication No. 49-20,944 discloses a method, wherein a combination of 3 kinds of initiators is used and further the polymerization temperature is raised corresponding to the proceeding of polymerization. Japanese Patent Laid-open Specification No. 54-107,994 discloses the use of a specifically limited bifunctional peroxide as a polymerization initiator.

As described above, although both the conventional diacyl type polymeric peroxide and polymeric peroxy ester are useful polymerization initiators in the production of a polymer having a high molecular weight from a vinyl monomer, such as styrene, acrylonitrile or the like, or a mixture thereof, or in the production of block copolymers, such as styrenemethyl methacrylate block copolymer, styrene-vinyl acetate block copolymer and the like. However, the conventional diacyl type polymeric peroxide or polymeric peroxy ester has the following drawbacks. (1) The former diacyl type polymeric peroxide is generally very poor in the solubility in various organic solvents (refer to Chem. Abst., Vol. 59, 7,651 (1963)), or is a sensitive compound, which is sensitive to impact and friction (refer to Chem. Abst., Vol. 64, 15,989g (1968) and Koka-shi, Vol. 69, page 718 (1966)), and it is difficult to use the diacyl type polymeric peroxide for commercial purpose. Further, diacyl type polymeric peroxides free from the above described drawbacks are disclosed in Japanese Patent Laid-open Specification Nos. 59-38,233, 59-93,725, 59-176,320 and 59-227,904. These diacyl type polymeric peroxides have a 10-hour half-life period temperature within the range of 60-70° C. When a vinyl monomer or a mixture thereof is polymerized by the use of the diacyl type polymeric peroxide, a vinyl polymer having a high molecular weight can be obtained, or when 2 kinds of vinyl monomers are block-polymerized by the use of the diacyl type polymeric peroxide, a so-called block copolymer can be obtained. However, in order to increase the polymerization rate and to improve the productivity of the polymers, a high polymerization temperature is necessary. For this purpose, it is necessary to use a diacyl type polymeric peroxide having a 10-hour half-life period temperature of 70–85° C., preferably 75–85° C., which is a little higher than the above described 10-hour half-life period temperature of 60–70° C., and the development of such diacyl type polymeric peroxide has been desired.

(2) Although the latter polymeric peroxy ester has an activity at high temperature, substantially all of the polymeric peroxy esters have a high melting point, are solid (refer to U.S. Pat. No. 3,117,166), are sensitive to impact and friction, and are very poor in the solubility in various organic solvents. Therefore, it is very difficult to use the polymeric peroxy ester as a polymerization initiator in commercial scale.

In the method for producing a polymer by the use of the conventional bifunctional peroxide or trifunctional peroxide, a polymer having a satisfactorily high molecular weight or a polymer having a satisfactorily high mechanical strength has not yet been obtained. In the method for producing a polymer by the use of the above described specifically limited diacyl type polymeric peroxide, a polymer having a somewhat high molecular weight can be obtained, but the polymerization rate is low. Further, even when the polymerization temperature is raised in the use of the diacyl type polymeric peroxide, the increase of the polymerization rate is small, and the molecular weight of the resulting polymer is reversely low. For example, although the use of the bifunctional peroxide or diacyl type polymeric peroxide in the production of a polymer containing o-methylstyrene unit is known, the resulting polymer has not yet a satisfactorily high mechanical strength. Therefore, the development of an improved polymerization initiator capable of increasing the productivity of a polymer and capable of producing a resin having a more improved performance has been demanded.

SUMMARY OF THE INVENTION

The inventors have found out a compound consisting of a novel and specifically limited polymeric peroxy ester having a 10-hour half-value period temperature of 70–85° C., which polymeric peroxy ester is free from the above described various drawbacks, is useful as a polymerization initiator, is safe in the production and handling, is easily soluble in vinyl monomer, and is one of commercially valuable polymeric peroxides in the production of a polymer having a high molecular weight and in the production of a block copolymer. As the result, the present invention has been accomplished.

That is, the first aspect of the present invention lies in a polymeric peroxy ester consisting of a chain compound, which has a structure consisting of 60–40 mol% of a structural unit (I) represented by the formula:

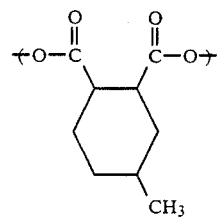

and 40–60 mol% of a structural unit (II) represented by the 9general formula:

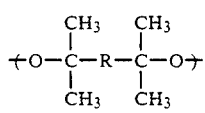

wherein R represents —CH$_2$CH$_2$—, —C≡C— or

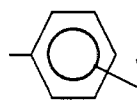

and has an average molecular weight of 1,000–15,000, said structural units (I) and (II) being bonded alternately, and the bonding system of the structural units (I) and (II) being a random bonding consisting of head-head bonding and head-tail bonding.

The second aspect of the present invention lies in a free radical-generating agent containing the polymeric peroxy ester as an active ingredient.

The third aspect of the present invention lies in a method for producing a polymer by the use of the polymeric peroxy ester as a polymerization initiator.

DESCRIPTION OF THE PREFERRED EMBODIMENTS

The polymeric peroxy ester of the present invention consists of the structural unit (I) and the structural unit (II) as described above, and the concrete embodiments of the structural unit (I) are as follows:

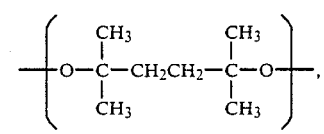

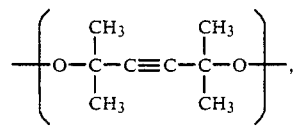

 and

-continued

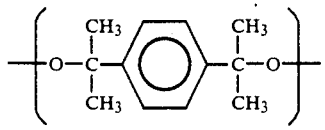

The polymeric peroxy ester of the present invention can be produced by the following method.

That is, the polymeric peroxy ester can be produced by reacting an acid chloride represented by the following formula

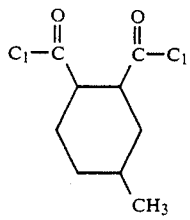

With a hydroperoxide represented by the following general formula

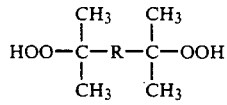

Wherein R represents $-CH_2=CH_2-C\equiv C-$ or

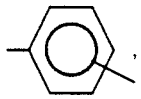

, in a molar ratio within the rang of from 6/4 to 4/6 in the presence of an alkali in a solvent, such as benzene, toluene or the like. The reaction temperature is a temperature within the range of from $-10$ to $+30°$ C., preferably from 0 to 30° C. The reaction time is 1–10 hours, preferably 3–5 hours. The alkali to be used in the present invention includes amines, such as pyridine and the like, inorganic bases, such as potassium hydroxide, sodium hydroxide and the like, and an aqueous solution thereof.

When the molar ratio of the acid chloride to the hydroperoxide is outside of the above described range, the yield of the resulting polymeric peroxy ester is low and hence the use of the acid chloride and hydroperoxide in a molar ratio outside the above described range is not preferable.

The fact that the polymeric peroxy ester of the present invention is a chain compound, wherein the structural units (I) and (II) ar alternately bonded, can be easily understood from the fact that the polymeric peroxy ester is obtained through a dehydrochlorination condensing peroxy esterification reaction of the above described acid chloride and hydroxyperoxide. Further, the terminal group of the resulting polymeric peroxy ester is either a carboxyl group or a hydroperoxy group.

The molecular weight of the resulting polymeric peroxy ester in the present invention varies depending upon the molar ratio of the starting acid chloride to hydroperoxide, and although the molecular weight of the resulting polymeric peroxy ester is theoretically infinite in the case where the starting acid chloride and hydroperoxide are used in an equimolar amount, there is actually a certain limit in the molecular weight due to the side reaction and the like. When the starting raw materials are used in a molar ratio within the above described range, the average molecular weight of the resulting polymeric peroxy ester lies within the range of 1,000–15,000.

The chemical structure of the polymeric peroxy ester of the present invention, which has been obtained by the above described method, can be determined by the infrared absorption spectrum and nuclear magnetic resonance spectrum. That is, the C=O bond in the ester and the O—O bond in the peroxide are identified by the infrared absorption spectrum, and the structures of $-CH_3$, $>CH_2$ and

are clarified by the nuclear CH3, .CH2 and magnetic resonance spectrum.

The average molecular weight of the resulting polymeric peroxy ester can be determined by the VPO method (by means of a 117 type molecular weight-measuring apparatus made by Corona Electric Co.).

The amount of peroxide group contained in the resulting polymeric peroxy ester can be calculated from the amount of active oxygen measured by the iodometry in the peroxy ester.

The use of the above described polymeric peroxy ester of the present invention is a free radical-generating agent. Concretely speaking, the peroxy ester is used as a polymerization initiator, hardening agent and cross-linking agent, and is more preferably used as a polymerization initiator.

As the vinyl monomer to be used in the method for producing a vinyl polymer according to the third aspect of the present invention, there can be used styrene, styrene homologues, such as α-methylstyrene, p-methylstyrene, vinyltoluene, vinylxylene and the like, acrylonitrile, methacrylonitrile, acrylic acid ester, methacrylic acid ester, vinyl acetate, vinyl chloride, vinylidene chloride, maleic acid ester, fumaric acid ester, maleimide and the like, and their mixtures. Further, these monomers can be used in admixture with butadiene or an elastomer, such as polybutadiene or the like.

Particularly, when the polymeric peroxy ester of the present invention is used in the homopolymerization of styrene, in the copolymerization of a mixture of styrene and α-methylstyrene, in the copolymerization of a mixture of styrene, α-methylstyrene and a third vinyl monomer, in the homopolymerization of acrylic acid ester or methacrylic acid ester, in the copolymerization of a mixture of acrylic acid ester and methacrylic acid ester, or in the copolymerization of a mixture of acrylic acid ester, methacrylic acid ester and a third vinyl monomer, polymers having a high molecular weight or resins having excellent properties can be obtained in a high productivity. The term "acrylic acid ester" or "methacrylic acid ester" herein used means ordinarily and commercially used acrylic acid esters or methacrylic acid esters, for example, methyl acrylate, ethyl acrylate, propyl acrylate, butyl acrylate, octyl acrylate, lauryl acrylate, methyl methacrylate, ethyl methacrylate, propyl methacrylate, octyl methacrylate, lauryl methacrylate and the like.

The addition amount of the polymeric peroxy ester of the present invention as a polymerization initiator varies depending upon the kind of monomers or the combination of monomers, but the polymeric peroxy ester is used in the same amount as the amount of an ordinary peroxide used in the ordinary polymerization. For example, the polymeric peroxy ester is used in an amount of about 0.01–5 parts by weight, calculated as pure substance, based on 100 parts by weight of the feeding amount of monomers. When the amount is less than 0.01 part by weight, the polymerization rate is apt be low, and when the amount is more than 5 parts by weight, the polymerization rate is apt to be too high to control the polymerization reaction. The polymeric peroxy ester may be added to the polymerization system at the initial stage of the polymerization or may be added to the polymerization system little by little in several stages during the course of the polymerization.

The polymeric peroxy ester of the present invention can be used alone or in admixture of at least 2 of fellow peroxy esters, or can be used in combination with an ordinarily used monofunctional peroxide, bifunctional peroxide or diacyl type polymeric peroxide. When the polymeric peroxy ester of the present invention is used in admixture of at least 2 of fellow peroxy esters or in combination with the ordinarily used peroxide, the polymerization temperature, the polymerization rate, and further the molecular weight and molecular weight distribution of the resulting polymers can be controlled.

For example, the polymerization temperature can be gradually raised by the using a combination system of a diacryl-type peroxide having a relatively low thermal decomposition temperature (10-hour half-life period temperature: 60–70° C.) and an ester-type peroxide having a relatively high thermal decomposition temperature (10-hour half-life period temperature: 75–100° C).

In the present invention, the ordinary suspension polymerization method, bulk polymerization method or solution polymerization method can be carried out. The polymerization temperature is generally within the range of 60–150° C., and is preferably within the range of 70–130° C. When the polymerization temperature is lower than 60° C., the polymerization time is apt to be long, and when the polymerization temperature is higher than 150° C., the molecular weight of the resulting polymer is low, and further the life of the polymerization initiator is short.

In the production of a copolymer from a monomer mixture containing α-methylstyrene, the amount ratio of α-methylstyrene to other vinyl monomer or monomers can be determined depending upon the properties demanded to the resulting copolymer. The amounts in percentage of α-methylstyrene to other vinyl monomer or monomers are for example, 10–50% by weight of α-methylstyrene, 20–90% by weight of styrene, and 0–30% by weight of a vinyl monomer copolymerizable with these monomers. When the amount of o-methylstyrene is less than 10% by weight, the resulting copolymer has not a satisfactorily high heat resistance, and when the amount of α-methylstyrene is more than 50% by weight, the resulting copolymer has a satisfactorily high heat resistance, but the polymerization rate is very low, and the productivity of the copolymer is very poor.

The high-molecular weight copolymer obtained in the present invention can be used not only as an ordinary molding material, but also as a material, which is required to have a limited molecular weight so that the material can be used as a base material for the toner of a copier, and other materials.

The polymeric peroxy ester of the present invention is a novel compound and has the following various merits. (1) The polymeric peroxy ester is a peroxide having a 10-hour half-life period temperature of 70–80° C. and having a relatively high activity at high temperature. When the peroxy ester is used as a polymerization initiator in the production of polymer, a polymer, which is higher in the average molecular weight and mechanical strength than a polymer obtained by the use of a conventional monofunctional peroxide, bifunctional peroxide or diacyl type polymeric peroxide, can be obtained without decreasing the polymerization rate, that is, in a high productivity. As the result, the physical properties, such as viscosity, mechanical strength and the like, of the resulting polymer can be freely controlled. (2) The peroxy ester of the present invention is a viscous liquid at room temperature and is insensitive to impact and friction, and hence is safe in the production and handling. (3) The peroxy ester of the present invention has a high solubility in organic solvents, for example, aromatic hydrocarbons, such as benzene, toluene and the like, esters, such as ethyl acetate, butyl acetate and the like, cyclic ethers, such as dioxane, tetrahydrofuran and the like, methyl ethyl ketone, chloroform, carbon tetrachloride and the like. Therefore, when the peroxy ester is added to a vinyl monomer as a polymerization initiator, the peroxy ester dissolves rapidly in the vinyl monomer, and hence the peroxy ester is excellent in the workability in the commercial use.

The polymeric peroxy ester of the present invention has further the following merits in addition to the above described merits. When 2 kinds of vinyl monomers are copolymerized with the use of the polymeric peroxy ester of the present invention, a block copolymer can be obtained. Further, the polymeric peroxy ester of the present invention can be used as a polymerization initiator for the production of expanded polystyrene and for the production of polyethylene, as a curing agent for unsaturated polyester, and as a crosslinking agent for polyethylene, elastomer and the like.

As described above, the polymeric peroxy ester of the present invention is a polymerization initiator, which is safe in the production and handling, dissolves rapidly in vinyl monomer, and has a 10-hour half-life period temperature of 70–85° C. and a high activity at a relatively high temperature. Particularly, when the polymeric peroxy ester is used as a polymerization initiator for the homopolymerization of styrene or for the copolymerization of styrene and a vinyl monomer copolymerizable with styrene, the polymeric peroxy ester can produce a styrene homopolymer or copolymer having a high molecular weight, a styrene resin having improved properties and a styrene block copolymer in a high productivity. Therefore, the polymeric peroxy ester of the present invention has a very high commercial merit.

The following examples are given for the purpose of illustration of this invention and are not intended as limitations thereof.

EXAMPLE 1

Synthesis of a polymeric peroxy ester

A mixture of 53.5 g (0.3 mol) of 2,5-dimethylhexane-2,5-dihydroperoxide (hereinafter, abbreviated as 2,5-H), 47.5 g (0.3 mol) of pyridine and 230 g of benzene was cooled to 10° C under stirring in a four-necked flask of 500 ml capacity equipped with a stirrer and a thermometer, and then 66.9 g (0.3 mol) of 4-methyl-1,2-cyclohexane dicarbonyl chloride (hereinafter, abbreviated as 1,2-MC) was dropwise added at 10–15° C. to the cooled mixture. After completion of the addition, the reaction was continued for 3 hours at a temperature of 23–25° C., and then pyridine hydrochloride formed as a by-product was filtered off. The filtrate was concentrated, and the concentrated filtrate was poured into petroleum to obtain 85.2 g of a white viscous liquid. The yield of this white viscous liquid based on 1,2-MC was 82.2%. The resulting white viscous liquid had an active oxygen content, measured by the ordinary iodometry, of 9.25%.

The characteristic absorption bands in the infrared absorption spectrum of this viscous liquid were 1770 cm$^{-1}$ (assigned to the C=O bond of peroxyester group) and 865 cm$^{-1}$ (assigned to O—O bond), and the $\tau$-values and strengths of chemical shifts of protons in the nuclear magnetic resonance spectrum of this viscous liquid were

| (a) | 3H  | 0.95 ppm, |
|-----|-----|-----------|
| (b) | 12H | 1.33 ppm, |
| (c) | 2H  | 1.56 ppm, |
| (d) | 4H  | 1.72 ppm, |
| (e) | 5H  | 2.05 ppm and |
| (f) | 2H  | 2.70 ppm. |

Therefore, the viscous liquid was identified to be a polymeric peroxy ester consisting of the following structural units (I) and (II'):

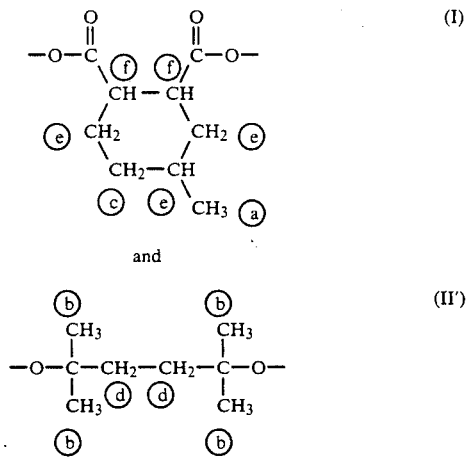

and $$\begin{array}{c} \text{(b)} \quad\quad \text{(b)} \\ \text{CH}_3 \quad\quad \text{CH}_3 \\ | \quad\quad\quad | \\ -O-C-CH_2-CH_2-C-O- \\ | \quad\quad\quad | \\ \text{CH}_3 \text{(d)} \quad \text{(d)} \quad \text{CH}_3 \\ \text{(b)} \quad\quad \text{(b)} \end{array} \quad (II')$$

When the average molecular weight of this polymeric peroxy ester was measured by the VPO method (with the use of a 117 type molecular weight-measuring apparatus made by Corona Electric Co.), the average molecular weight of this polymeric peroxy ester was found to be 7,920.

Then, the resulting polymeric peroxy ester was dissolved in cumene to produce a 0.1 mol/l cumene solution, and the thermal decomposition rate constant of the peroxy ester due to its peroxide group was measured at an interval of 5° C within the temperature range of 75–95° C. Further, the 10-hour half-life period temperature (hereinafter abbreviated as $T_{10}$) of this polymeric peroxy ester was calculated by the use of these values of the thermal decomposition rate constant by means of the Arrhenius equation. It was found that this polymeric peroxy ester had a $T_{10}$ of 82.1° C.

In order to test the safeness of this polymeric peroxy ester, there was effected a hammer impact test, wherein 50 mg of a peroxy ester sample was placed on an iron plate, and a hammer having a weight of 600 g was dropped on the sample from a height of 20 cm to give an impact to the sample, and this dropping was repeated by 10 times to give 10 times of impacts in total to the sample. Whether the decomposition sound of the sample was heard or not was confirmed in every time of dropping, and when the decomposition sound was heard by even one time in 10 times of total impacts, the sample was marked as ◯, and when the decomposition sound was not heard, the sample was marked as X. The obtained result is shown in Table 1.

Then, the amount of this polymeric peroxy ester dissolved in various solvents (100 g) at 25° C. was measured, and the obtained result is shown in Table 2.

EXAMPLE 2

A polymerization reaction was effected in the same manner as described in Example 1, except that 44.1 g (0.25 mol) of 2,5-dimethyl-3-hexyn-2,5-dihydroperoxide was used in place of 2,5-H, to obtain 75.8 g of a white viscous liquid similar to the viscous liquid obtained in Example 1. When the active oxygen content in the resulting viscous liquid was measured in the same manner as described in Example 1, it was found that the viscous liquid had an active oxygen content of 8.87%.

The characteristic absorption bands in the infrared absorption spectrum of this viscous liquid were 1,770 cm$^{-1}$ (assigned to C=O bond of peroxy ester group) and 865 cm$^{-1}$ (assigned to O—O bond), and the $\tau$-values and strengths of chemical shifts of protons in the nuclear magnetic resonance spectrum of this viscous liquid were

| (a) | 3H  | 0.93 ppm, |
|-----|-----|-----------|
| (b) | 12H | 1.30 ppm, |
| (c) | 2H  | 1.56 ppm, |
| (d) | 5H  | 2.08 ppm and |
| (e) | 2H  | 2.70 ppm. |

Therefore, the viscous liquid was identified to be a polymeric perox ester consisting of the following structural units (I) and (II'')

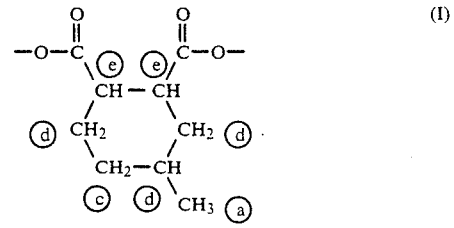

and

-continued

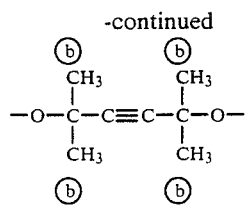
(II″)

When the average molecular weight of this polymeric peroxy ester was measured by the VPO method (with the use of the above described 117 type molecular weight-measuring apparatus), the average molecular weight of this polymeric peroxy ester was found to be 2,150.

Then, the $T_{10}$ of the resulting polymeric peroxy ester was measured in the same manner as described in Example 1. It was found that this polymeric peroxy ester had a $T_{10}$ of 81.4° C.

Further, the safeness of the polymeric peroxy ester was measured in the same manner as described in Example 1. The obtained result is shown in Table 1.

Then, the amount of this polymeric peroxy ester dissolved in various solvents (100 g) was measured. The obtained result shown in Table 2.

EXAMPLE 3

A polymerization reaction was effected in the same manner as described in Example 1, except that 79.2 g (0.35 mol) of m-diisopropylbenzene dihydroperoxide was used in place of 2,5-H, to obtain 104.0 g of a white viscous liquid similar to the viscous liquid obtained in Example 1. When the active oxygen content in the resulting viscous liquid was measured in the same manner as described in Example 1, it was found that the viscous liquid had an active oxygen content of 7.65%.

The characteristic absorption bands in the infrared absorption spectrum of this viscous liquid were 1,770 cm$^{-1}$ (assigned to C=O bond of peroxy ester group) and 865 cm$^{-1}$ (assigned to O—O bond), and the τ-values and strengths of chemical shifts of protons in the nuclear magnetic resonance spectrum of this viscous liquid were

|     |     |               |
| --- | --- | ------------- |
| (a) | 3H  | 0.95 ppm,     |
| (b) | 12H | 1.33 ppm,     |
| (c) | 2H  | 1.56 ppm,     |
| (d) | 5H  | 2.05 ppm,     |
| (e) | 2H  | 2.75 ppm and  |
| (f) | 4H  | 7.23 ppm.     |

Therefore, the viscous liquid was identified to be a polymeric peroxy ester consisting of the following structural units (I) and (II‴)

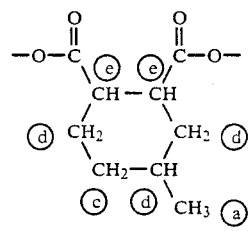
(I)

and

-continued

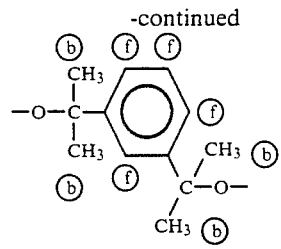
(II‴)

When the average molecular weight of this polymeric peroxy ester was measured by the VPO method (with the use of the above described 117 type molecular weight-measuring apparatus), the average molecular weight of this polymeric peroxy ester was found to be 4,530.

Then, the $T_{10}$ of the resulting polymeric peroxy ester was measured in the same manner as described in Example 1. It was found that this polymeric peroxy ester had a $T_{10}$ of 77.8° C.

Further, the safeness of the polymeric peroxy ester was measured in the same manner as described in Example 1. The obtained result is shown in Table 1. Then, the amount of this polymeric peroxy ester dissolved in various solvents (100 g) was measured. The obtained result is shown in Table 2.

EXAMPLE 4

A polymerization reaction was effected in the same manner as described in Example 1, except that 67.9 g (0.3 mol) of p-diisopropylbenzene dihydroperoxide was used in place of 2,5-H, to obtain 99.3 g of a white viscous liquid similar to the viscous liquid obtained in Example 1. The yield of this white viscous liquid based on 1,2-MC was 83.5%. When the active oxygen content in the resulting viscous liquid was measured in the same manner as described in Example 1, it was found that the viscous liquid had an active oxygen content of 8.08%.

The characteristic absorption bands in the infrared absorption spectrum of this viscous liquid were 1,770 cm$^{-1}$ (assigned to C=O bond of peroxy ester group) and 865 cm-1 (assigned to O—O bond), and the τ-values and strengths of chemical shifts of protons in the nuclear magnetic resonance spectrum of this viscous liquid were

|     |     |               |
| --- | --- | ------------- |
| (a) | 3H  | 0.95 ppm,     |
| (b) | 12H | 1.30 ppm,     |
| (c) | 2H  | 1.58 ppm,     |
| (d) | 5H  | 2.05 ppm,     |
| (e) | 2H  | 2.72 ppm and  |
| (f) | 4H  | 7.23 ppm.     |

Therefore, the viscous liquid was identified to be a polymeric peroxy ester consisting of the following structural units (I) and (II⁗)

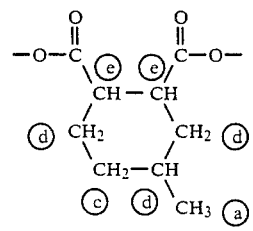
(I)

and

13
-continued

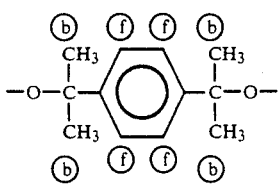
(II'''')

When the average molecular weight of this polymeric peroxy ester was measured by the VPO method (with the use of the above described 117 type molecular weight-measuring apparatus), the average molecular weight of this polymeric peroxy ester was found to be 13,300.

Then, the $T_{10}$ of the resulting polymeric peroxy ester was measured in the same manner as described in Example 1. It was found that this polymeric peroxy ester had a $T_{10}$ of 78.0° C.

Further, the safeness of the polymeric peroxy ester was measured in the same manner as described in Example 1. The obtained result is shown in Table 1.

Then, the amount of this polymeric peroxy ester dissolved in various solvents (100 g) was measured. The obtained result is shown in Table 2.

COMPARATIVE EXAMPLE 1

A conventional solid diacyl type polymeric peroxide was produced by reacting dodecanedioic acid chloride with sodium peroxide. It was identified from the characteristic absorption bands in the infrared absorption spectrum and the τ-values and strengths in the nuclear magnetic resonance spectrum of this diacyl type polymeric peroxide that the peroxide consisted of a structural unit represented by the following formula:

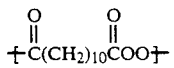

The measurement of the average molecular weight of the peroxide by means of the VPO method showed that the peroxide had an average molecular weight of 1,620.

Further, the safeness and solubility of the peroxide were measured in the same manner as described in Example 1. The obtained results are shown in Tables 1 and 2.

14

TABLE 1

| | Peroxide Structural formula | Safeness Hammer impact test* |
|---|---|---|
| Example 1 | ![structure] | X |
| Example 2 | ![structure] | X |
| Example 3 | ![structure] | X |
| Example 4 | ![structure] | X |
| Comparative example 1 | $+C(CH_2)_{10}COO+$ | O |

*O: Decomposition sound
X: No decomposition sound

It is clear from Table 1 that the polymeric peroxy ester of the present invention is superior to a conventional diacyl type polymeric peroxide in the safeness against impact.

TABLE 2

| Peroxide | | Solubility*1 | | | | | |
|---|---|---|---|---|---|---|---|
| | | | Solvent | | | | Vinyl monomer |
| Structural formula | Average molecular weight | Benzene | Toluene | Chloroform | Ethyl acetate | Styrene | Methyl methacrylate |
| Examples 1~4 [structure] *2 | 1,000~15,000 | at least 200 | at least 200 | at least 200 | at least 200 | at least 200 | at least 200 |

TABLE 2-continued

| | Peroxide | | Solubility[1] | | | | Vinyl monomer | |
|---|---|---|---|---|---|---|---|---|
| | | Average molecular | Solvent | | | | | |
| | Structural formula | weight | Benzene | Toluene | Chloroform | Ethyl acetate | Styrene | Methyl methacrylate |
| Comparative example 1 | —[C(CH$_2$)$_{10}$COO]— (with two C=O groups) | 1,620 | 1.9 | 1.0 | 10.0 | 0.3 | 0.5 | 0.8 |

[1]Solubility is indicated by the number of grams dissolved in 100 g of solvent or vinyl monomer at 25° C.

[2]R represents —CH$_2$CH$_2$—, —C≡C— or —⟨phenyl⟩—.

It is clear from Table 2 that the polymeric peroxy ester of the present invention is superior to a conventional diacyl type polymeric peroxide in the solubility in various solvents.

EXAMPLE 5

Polymerization (bulk polymerization) of styrene and measurement of the average molecular weight of the resulting polystyrene In 1 l of styrene was dissolved 0.01 mol of the following polymeric peroxy ester

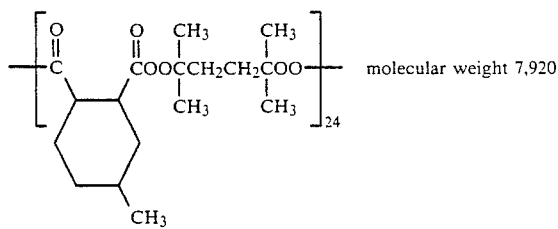

molecular weight 7,920

, used as a polymerization initiator, to prepare a polymerization reaction sample. Into a glass ampule having an inner diameter of 12 mm was sealed 5 ml of the sample, and a polymerization was effected at 90° C. for 8 hours. Then, the reaction solution was taken out from the ampule, a part of the reaction solution was dissolved in benzene, and the amount of unreacted monomer was measure by the internal standard method by means of the gaschromatography, from which the polymerization conversion was calculated.

Further, a part of the above obtained reaction solution was dissolved in tetrahydrofuran, and the average molecular weight of the resulting polymer was measured by the GPC (with use of an HLC-820R type high-speed liquid chromatograph made by Toso Co.)

The obtained results are shown in Table 3.

EXAMPLE 6

A polymerization reaction was effected in the same manner as described in Example 5, except that the following polymerization initiator was used.

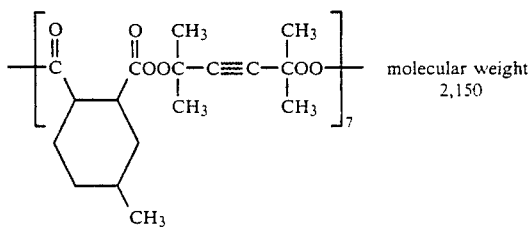

molecular weight 2,150

The obtained results is shown in Table 3.

EXAMPLE 7

A polymerization reaction was effected in the same manner as described in Example 5, except that the following polymerization initiator was used.

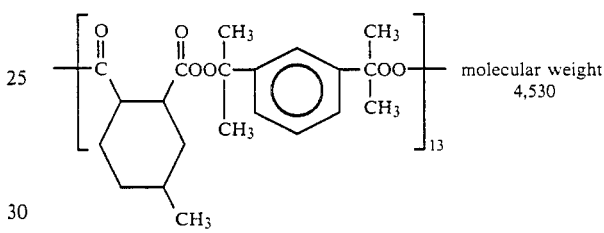

molecular weight 4,530

The obtained results is shown in Table 3.

EXAMPLE 8

A polymerization reaction was effected in the same manner as described in Example 5, except that the following polymerization initiator was used.

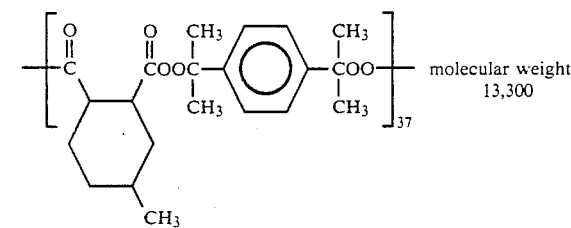

molecular weight 13,300

The obtained results is shown in Table 3.

COMPARATIVE EXAMPLE 2

A polymerization reaction was effected in the same manner as described in Example 5, except that the following conventional diacyl type polymeric peroxide

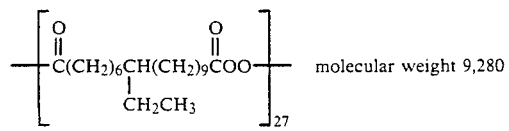

molecular weight 9,280 was used as a polymerization initiator. The obtained result is shown in Table 3.

COMPARATIVE EXAMPLE 3

A polymerization reaction was effected in the same manner as described in Example 5, except that a monofunctional peroxide of t-butylperoxy hexahydrobenzoate having a decomposition rate, which is very similar to the decomposition rate of the peroxide used in the ent invention, was used. The obtained result is shown in Table 3.

TABLE 3

| Peroxide | | Result of polymerization[*1] | | |
|---|---|---|---|---|
| | | Conversion (%) | Number-average molecular weight ($\times 10^4$) | Weight-average molecular weight ($\times 10^4$) |
| Example 5 | [structure: cyclohexyl-methyl ring with -C(=O)-O-O-C(=O)-C(CH_3)_2-CH_2CH_2-C(CH_3)_2-O-O- repeating unit, n=24] | 91 | 30.1 | 87.2 |
| Example 6 | [structure: cyclohexyl-methyl ring with -C(=O)-O-O-C(=O)-C(CH_3)_2-C≡C-C(CH_3)_2-O-O- repeating unit, n=7] | 91 | 28.9 | 85.0 |
| Example 7 | [structure: cyclohexyl-methyl ring with -C(=O)-O-O-C(=O)-C(CH_3)_2-(phenyl)-C(CH_3)_2-O-O- repeating unit, n=13] | 94 | 28.0 | 82.0 |
| Example 8 | [structure: cyclohexyl-methyl ring with -C(=O)-O-O-C(=O)-C(CH_3)_2-(phenyl)-C(CH_3)_2-O-O- repeating unit, n=37] | 95 | 27.7 | 81.4 |
| Comparative example 2 | [structure: -C(=O)(CH_2)_6CH(CH_2CH_3)(CH_2)_3C(=O)-O-O- repeating unit, n=27] | 36 | 11.5 | 30.3 |
| Comparative example 3 | t-butylperoxy hexahydrobenzoate | 93 | 16.1 | 48.9 |
| Comparative example 4 | di-t-hexylperoxy hexahydrophthalate | 92 | 19.1 | 57.0 |

[*1] Conversion and average molecular weight after 8 hours present invention, was used. The obtained result is shown in Table 3.

COMPARATIVE EXAMPLE 4

A polymerization reaction was effected in the same manner as described in Example 5, except that a bifunctional peroxide of di-t-hexylperoxy hexahydrophthalate having a decomposition rate, which is very similar to the decomposition rate of the peroxide used in the present invention, was used. The obtained result is shown in Table 3.

It is clear from Table 3 that the use of the peroxide of the present invention results in a polymerization conversion remarkably higher than that obtained by the use of a conventional diacyl type polymeric peroxide illustrated in Comparative example 2. Moreover, each of the polymers obtained by the use of the peroxide of the present invention has an average molecular weight remarkably higher than the average molecular weight of a polymer obtained by the use of a conventional peroxide illustrated in Comparative example 2, 3 or 4.

EXAMPLE 9

Copolymerization (bulk polymerization) of styrene and α-methylstyrene, and measurement of the average molecular weight of the resulting copolymer In 1 l of a mixture of 80% by weight of styrene and 20% by weight of α-methylstyrene was dissolved 0.01 mol of the following polymeric peroxy ester

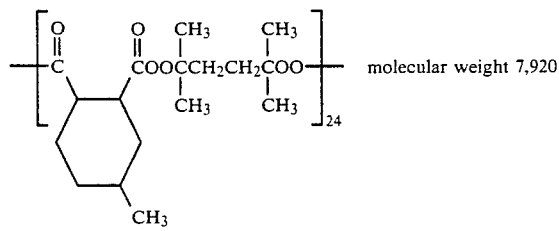

, used as a polymerization initiator, to prepare a copolymerization reaction sample. Into a glass ampule having an inner diameter of 12 mm was sealed 5 ml of the sample, and a polymerization was effected at 90° C. for 8 hours. Then, the reaction solution was taken out from the ampule, a part of the reaction solution was dissolved in benzene, and the amount of unreacted monomer was measured by the internal standard method by means of the gaschromatography, from which the polymerization conversion was calculated. Further, the mechanical strengths (tensile strength (JIS K-6871) and bending strength (JIS K-6871)) of the resulting copolymer were measured.

The obtained results are shown in Table 4.

EXAMPLE 10

A polymerization reaction was effected in the same manner as described in Example 9, except that the following polymerization initiator was used.

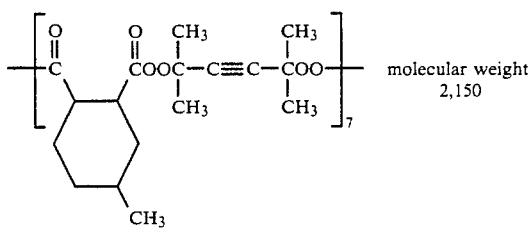

The obtained results is shown in Table 4.

EXAMPLE 11

A polymerization reaction was effected in the same manner as described in Example 9, except that the following polymerization initiator was used.

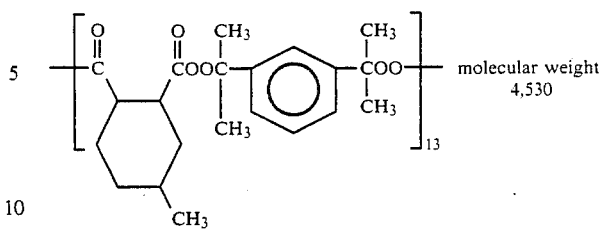

The obtained results is shown in Table 4.

EXAMPLE 12

A polymerisation reaction was effected in the same manner as described in Example 9, except that the following polymerizatioon initiator was used.

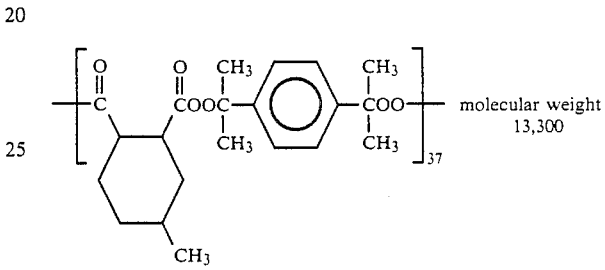

The obtained results is shown in Table 4.

COMPARATIVE EXAMPLE 5

A polymerization reaction was effected in the same manner as described in Example 9, except that the following conventional diacyl type polymeric peroxide

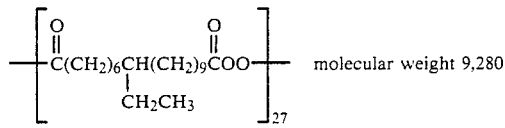

was used as a polymerization initiator. The obtained result is shown in Table 4.

COMPARATIVE EXAMPLE 6

A polymerization reaction was effected in the same manner as described in Example 9, except that a monofunctional peroxide of t-butylperoxy hexahydrobenzoate having a decomposition rate, which is very similar to the decomposition rate of the peroxide used in the present invention, was used. The obtained result is shown in Table 4.

COMPARATIVE EXAMPLE 7

A polymerization reaction was effected in the same manner as described in Example 9, except that a bifunctional peroxide of di-t-hexylperoxy hexahydrophthalate having a decomposition rate, which is very similar to the decomposition rate of the peroxide used in the present invention, was used. The obtained result is shown in Table 4.

TABLE 4

| | Peroxide | Result of copolymerization Conversion[*1] (%) | Mechanical strength Tensile strength (kg/cm²) | Mechanical strength Bending strength (kg/cm²) |
|---|---|---|---|---|
| Example 9 | $\left[\begin{array}{c}\text{-C(=O)-[cyclohexyl-CH}_3\text{]-C(=O)OOC(CH}_3)_2\text{CH}_2\text{CH}_2\text{C(CH}_3)_2\text{COO-}\end{array}\right]_{24}$ | 39 | 470 | 695 |
| Example 10 | $\left[\begin{array}{c}\text{-C(=O)-[cyclohexyl-CH}_3\text{]-C(=O)OOC(CH}_3)_2\text{-C≡C-C(CH}_3)_2\text{COO-}\end{array}\right]_{7}$ | 42 | 450 | 675 |
| Example 11 | $\left[\begin{array}{c}\text{-C(=O)-[cyclohexyl-CH}_3\text{]-C(=O)OOC(CH}_3)_2\text{-[phenylene]-C(CH}_3)_2\text{COO-}\end{array}\right]_{13}$ | 41 | 445 | 670 |
| Example 12 | $\left[\begin{array}{c}\text{-C(=O)-[cyclohexyl-CH}_3\text{]-C(=O)OOC(CH}_3)_2\text{-[phenylene]-C(CH}_3)_2\text{COO-}\end{array}\right]_{37}$ | 43 | 440 | 665 |
| Comparative example 5 | $\left[\begin{array}{c}\text{-C(=O)(CH}_2)_6\text{CH(CH}_2\text{CH}_3)(CH}_2)_9\text{COO-}\end{array}\right]_{27}$ | 20 | 410 | 640 |
| Comparative example 6 | t-butylperoxy hexahydrobenzoate | 40 | 270 | 350 |
| Comparative example 7 | di-t-hexylperoxy hexahydrophthalate | 40 | 390 | 460 |

[*1] Conversion after 8 hours

It is clear from Table 4 that the use of the peroxide of the present invention results in a polymerization conversion remarkably higher than that obtained by the use of a conventional diacyl type polymeric peroxide (Comparative example 5). Moreover, the copolymers obtained by the use of the peroxide of the present invention are remarkably superior in the mechanical strength to the copolymers obtained by the use of a conventional peroxide in Comparative example 5, 6 or 7.

EXAMPLE 13

Copolymerization (suspension polymerization) of styrene, α-methylstyrene and acrylonitrile, and measurement of the physical properties of the resulting copolymer In 1 l of a mixture of 60% by weight of styrene, 30% by weight of α-methylstyrene and 10% by weight of acrylonitrile was dissolved 0.04 mol of the following polymeric peroxy ester

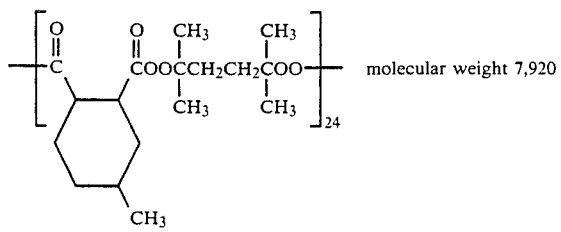 molecular weight 7,920

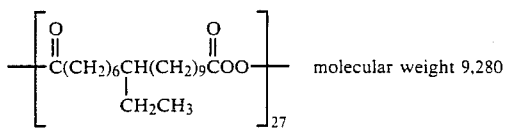 molecular weight 9,280

, used as a polymerization initiator, to prepare a copolymerization reaction sample. A suspension produced by mixing 100 g of the sample with a suspending medium consisting of 400 g of water, 2 g of calcium tertiary phosphate and 0.02 g of sodium dodecylbenzenesulfonate, was sealed into an autoclave of 1 l capacity, which had previously been purged with nitrogen, and a polymerization reaction was effected at 90° C. for 15 hours. After the polymerization, a part of the reaction solution was dissolved in DMF, and the amount of unreacted monomer was measured by the internal standard method by means of the gaschromatography, from which the polymerization conversion was calculated. Further, the mechanical strengths (bending strength (JIS K-6871) and Izod impact strength (JIS K-6871)) were measured.

was used as a polymerization initiator. The obtained result is shown in Table 5.

COMPARATIVE EXAMPLE 9

A polymerization reaction was effected in the same manner as described in Example 13, except that a monofunctional peroxide of t-butylperoxy hexahydrobenzoate having a decomposition rate, which is very similar to the decomposition rate of the peroxide used in the present invention, was used. The obtained result is shown in Table 5.

COMPARATIVE EXAMPLE 10

A polymerization reaction was effected in the same manner as described in Example 13, except that a bifunctional peroxide of di-t-hexylperoxy hexahydrophthalate having a decomposition rate, which is very similar to the decomposition rate of the peroxide used in the present invention, was used. The obtained result is shown in Table 5.

TABLE 5

| | Peroxide | Result of co-polymerization Conversion*[1] (%) | Mechanical strength Bending strength (kg/cm$^2$) | Izod impact strength*[2] (kg · cm/cm$^2$) |
|---|---|---|---|---|
| Example 13 | (structure shown) | 90 | 370 | 5.5 |
| Comparative example 8 | (structure shown) | 35 | 305 | 4.1 |
| Comparative example 9 | t-butylperoxy hexahydrobenzoate | 91 | 200 | 1.0 |
| Comparative example 10 | di-t-hexylperoxy hexahydrophthalate | 91 | 280 | 2.7 |

*[1]Conversion after 15 hours
*[2]no notches

The obtained results are shown in Table 5.

COMPARATIVE EXAMPLE 8

A polymerization reaction was effected in the same manner as described in Example 13, except that the following conventional diacyl type polymeric peroxide It is clear from Table 5 that the use of the peroxide of the present invention results in a polymerization conversion remarkably higher than that obtained by the use of a conventional diacyl type polymeric peroxide (Comparative example 8). Moreover, the copolymer obtained by the use of the peroxide of the present invention is remarkably superior in the mechanical strength to the copolymers obtained by the use of a conventional peroxide in Comparative example 8, 9 or 10.

EXAMPLE 14

Copolymerization (suspension polymerization) of styrene, α-methylstyrene and acrylonitrile, and measurement of the physical properties of the resulting copolymer A polymerization reaction was effected in the same manner as described in Example 13, except that 1 l of a mixture of 20% by weight of styrene, 50% by weight of α-methylstyrene and 30% by weight of acrylonitrile was used in place of 1 l of the mixture of 60% by weight of styrene, 30% by weight of α-methylstyrene and 10% by weight of acrylonitrile.

The obtained results are shown in Table 6.

COMPARATIVE EXAMPLE 11

A polymerization reaction was effected in the same manner as described in Example 14, except that the following conventional diacyl type polymeric peroxide $$\left[ \begin{array}{c} \underset{\|}{O} \\ -C(CH_2)_6CH(CH_2)_9COO- \\ | \\ CH_2CH_3 \end{array} \right]_{27} \quad \text{molecular weight 9,280}$$

was used as a polymerization initiator. The obtained result is shown in Table 6.

COMPARATIVE EXAMPLE 12

A polymerization reaction was effected in the same manner as described in Example 14, except that a monofunctional peroxide of t-butylperoxy hexahydrobenzoate having a decomposition rate, which is very similar to the decomposition rate of the peroxide used in the present invention, was used. The obtained result is shown in Table 6.

COMPARATIVE EXAMPLE 13

A polymerization reaction was effected in the same manner as described in Example 14, except that a bifunctional peroxide of di-t-hexylperoxy hexahydrophthalate having a decomposition rate, which is very similar to the decomposition rate of the peroxide used in the present invention, was used. The obtained result is shown in Table 6.

TABLE 6

| | Peroxide | Result of copolymerization Conversion*[1] (%) | Bending strength (kg/cm²) | Izod impact strength*[2] (kg.cm/cm²) |
|---|---|---|---|---|
| Example 14 | 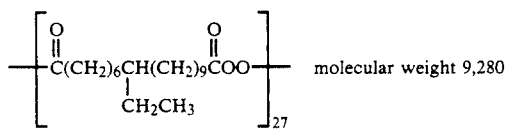 | 96 | 570 | 6.7 |
| Comparative example 11 | | 36 | 430 | 5.1 |
| Comparative example 12 | t-butylperoxy hexahydrobenzoate | 99 | 350 | 3.1 |
| Comparative example 13 | di-t-hexylperoxy hexahydrophthalate | 98 | 400 | 4.7 |

*[1] Conversion after 15 hours
*[2] no notches

It is clear from Table 6 that the use of the peroxide of the present invention results in a polymerization conversion remarkably higher than that obtained by the use of a conventional diacyl type polymeric peroxide (Comparative example 11). Moreover, the copolymer obtained by the use of the peroxide of the present invention is remarkably superior in the mechanical strength to the copolymers obtained by the use of a conventional peroxide in Comparative example 11, 12 or 13.

EXAMPLE 15

Copolymerization (solution polymerization) of methyl methacrylate and n-butyl acrylate, and measurement of the average molecular weight of the resulting copolymer Into a three-necked flask of 500 ml capacity were charged 50 parts by weight of methyl methacrylate, 50 parts by weight of n-butyl acrylate, 250 parts by weight of benzene and 2 parts by weight of the following polymeric peroxide

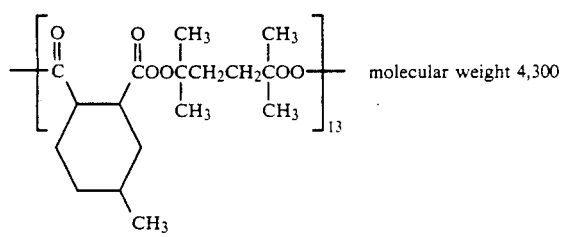 molecular weight 4,300

After the vacant space of the flask was fully purged with nitrogen gas, the flask was hermetically sealed. The flask was placed in a constant temperature water bath kept at 75° C for 7 hours to effect a polymerization reaction. The stirring was effected by means of an ordinary semicircular Teflon stirring blade.

After the polymerization, the polymerization product was cooled, and poured into methanol to precipitate the resulting copolymer, which was a white powder. The polymerization conversion was calculated from the weight of the resulting white powder. Further, the average molecular weight of the white powder was measured by the GPC. The obtained results are shown in Table 7.

COMPARATIVE EXAMPLE 14

A polymerization reaction was effected in the same manner as described in Example 15, except that a bifunctional peroxide of di-t-butylperoxy hexahydrophthalate having a decomposition rate, which is very similar to the decomposition rate of the peroxide used in the present invention, was used. The obtained result is shown in Table 7.

rene, 140 parts by weight of acrylonitrile and 2 parts by weight of the following polymeric peroxide

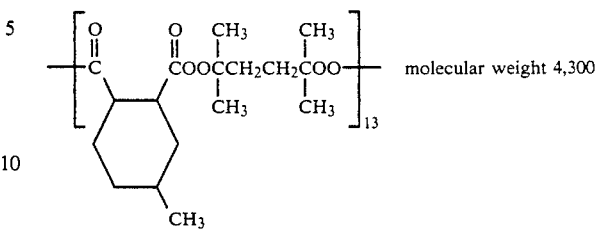

were charged into the autoclave. After the vacant space of the autoclave was fully purged with nitrogen gas, the autoclave was hermetically sealed. The autoclave was placed in a constant temperature water bath kept at 95° C. for 5 hours to effect a polymerization reaction. The stirring was effected by rotating the autoclave in the water bath at a rate of 32 rpm.

After the polymerization, the polymerization product was cooled, and poured into methanol to precipitate the resulting copolymer, which was a white powder. The

TABLE 7

| | Peroxide | Conversion (%) | Number-average molecular weight (× 10⁴) | Weight-average molecular weight (× 10⁴) |
|---|---|---|---|---|
| Example 15 | (structure shown) | 94 | 3.5 | 8.5 |
| Comparative example 14 | di-t-butylperoxy hexahydrophthalate | 90 | 2.5 | 6.0 |

*Conversion and average molecular weight after 5 hours

It is clear from Table 7 that the use of the peroxide of the present invention results in a copolymer having an average molecular weight remarkably higher than that of a copolymer (Comparative example 14) obtained by the use of a conventional peroxide.

EXAMPLE 16

Copolymerization (suspension polymerization) of α-methylstyrene and acrylonitrile, and measurement of the average molecular weight of the resulting copolymer In a stainless steel autoclave of 500 ml capacity, 0.1 g of polyvinyl alcohol was dissolved in 200 ml of deionized water. Then, 60 parts by weight of α-methylstypolymerization conversion was calculated from the weight of the resulting white powder. Further, the average molecular weight of the white powder was measured by the GPC. The obtained results are shown in Table 8.

COMPARATIVE EXAMPLE 15

A polymerization reaction was effected in the same manner as described in Example 16, except that a bifunctional peroxide of di-t-butylperoxy hexahydrophthalate having a decomposition rate, which is very similar to the decomposition rate of the peroxide used in the present invention, was used. The obtained result is shown in Table 8.

TABLE 8

| | | Result of copolymerization* | | |
|---|---|---|---|---|
| | Peroxide | Conversion (%) | Number-average molecular weight ($\times 10^4$) | Weight-average molecular weight ($\times 10^4$) |
| Example 16 | 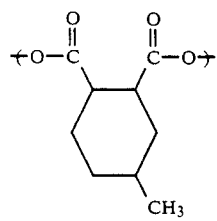 | 88 | 14 | 30 |
| Comparative example 15 | di-t-butylperoxy hexahydrophthalate | 88 | 10 | 18 |

*Conversion and average molecular weight after 5 hours

It is clear from Table 8 that the use of the peroxide of the present invention results in a copolymer having an average molecular weight remarkably higher than that of a copolymer (Comparative example 15) obtained by the use of a conventional peroxide.

What is claimed is:

1. A polymeric peroxy ester, which consists of a structural unit represented by the formula (I):

(I)

and a structural unit represented by the general formula (II):

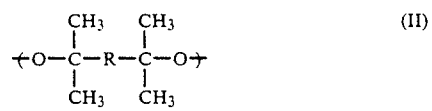

(II)

, wherein R represents —$CH_2CH_2$—, —C≡C—

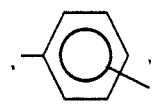

and has an average molecular weight of 1,000-15,000, said structural unit (I]) and said structural unit (I) being bonded alternately, the bonding system of the structural units ( ) and ( ) being a random bonding consisting of head-head bonding and head-tail bonding, and the molar ratio of the structural unit () to the structural unit (II) being within the range of from 6:4 to 4:6.

2. A free radical-generating agent containing the polymeric peroxy ester according to claim 1 as an active ingredient.

* * * * *